US006714124B2

United States Patent
Meyer

(10) Patent No.: US 6,714,124 B2
(45) Date of Patent: Mar. 30, 2004

(54) TRUCK TRAILER IMPACT WARNING SYSTEM

(76) Inventor: Cloy F. Meyer, Box 908, 243 E. Greene St., Postville, IA (US) 52162

( * ) Notice: Subject to any disclaimer, the term of this patent is extended or adjusted under 35 U.S.C. 154(b) by 0 days.

(21) Appl. No.: 09/838,438

(22) Filed: Apr. 19, 2001

(65) Prior Publication Data

US 2002/0154004 A1 Oct. 24, 2002

(51) Int. Cl.$^7$ .............................................. G08B 21/00
(52) U.S. Cl. ..................... 340/431; 200/61.44; 280/432
(58) Field of Search ................. 340/431, 432, 340/686.1; 200/61.42, 61.44; 280/432

(56) References Cited

U.S. PATENT DOCUMENTS

| 2,214,161 A | * | 9/1940 | Cater ......................... 340/431 |
| 2,927,310 A | | 3/1960 | Knapp |
| 3,588,809 A | | 6/1971 | Devlin |
| 3,605,088 A | * | 9/1971 | Savelli ....................... 340/431 |
| 3,833,928 A | * | 9/1974 | Gavit et al. ................. 340/431 |
| 3,906,442 A | | 9/1975 | Mosteller |
| 4,040,006 A | | 8/1977 | Kimmel |
| 4,122,390 A | * | 10/1978 | Kollitz et al. .......... 340/870.38 |
| 4,341,395 A | * | 7/1982 | Miller et al. ................. 280/432 |
| 5,044,651 A | | 9/1991 | Weikel |
| 5,558,351 A | * | 9/1996 | Hunter ....................... 280/432 |
| 5,566,963 A | | 10/1996 | Johnson |
| 5,678,505 A | | 10/1997 | Leung |
| 5,890,728 A | | 4/1999 | Zilm |
| 6,268,800 B1 | * | 7/2001 | Howard ................... 340/686.1 |

* cited by examiner

*Primary Examiner*—John Tweel
(74) *Attorney, Agent, or Firm*—Thomas E. Frantz

(57) ABSTRACT

A system adapted to be mounted on a pickup truck for warning the driver of the truck should the front section of a fifth wheel trailer pivotally supported on a hitch secured in the bed of the truck approach a point where there is imminent danger of impact between the front section of the trailer and the back of the cab as the truck and trailer are executing a turn. The system comprises a warning device which is to be placed in the cab of the truck and alarm units mounted on the front wall of the truck bed, each such alarm unit having a contact member which is movable in response to contact with the front section of the trailer to operate a switch and activate the warning device to warn the driver that the radius of a turn then being performed must be increased to avoid an impact between the front section of the trailer and the back of the cab.

18 Claims, 6 Drawing Sheets

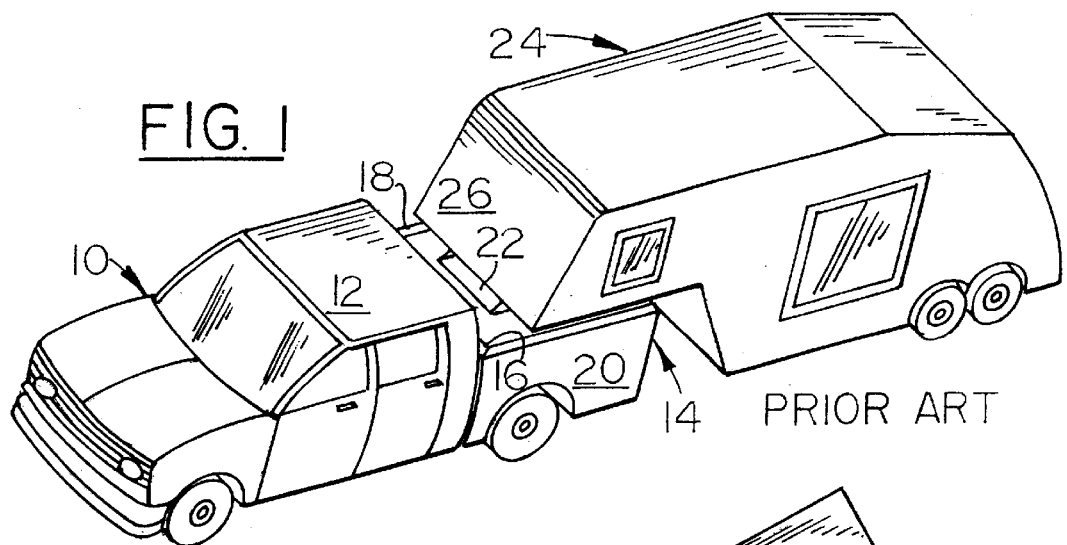
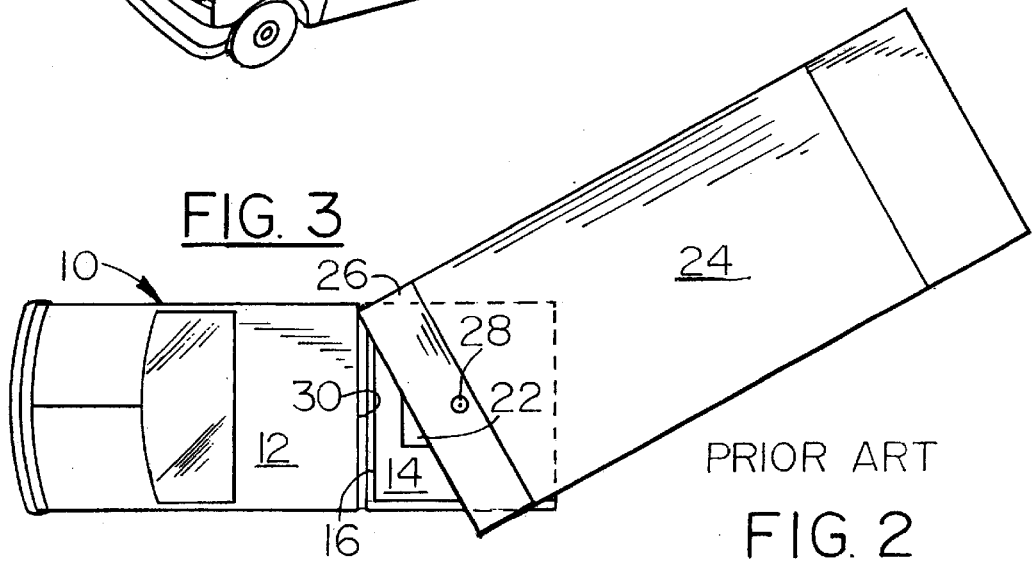
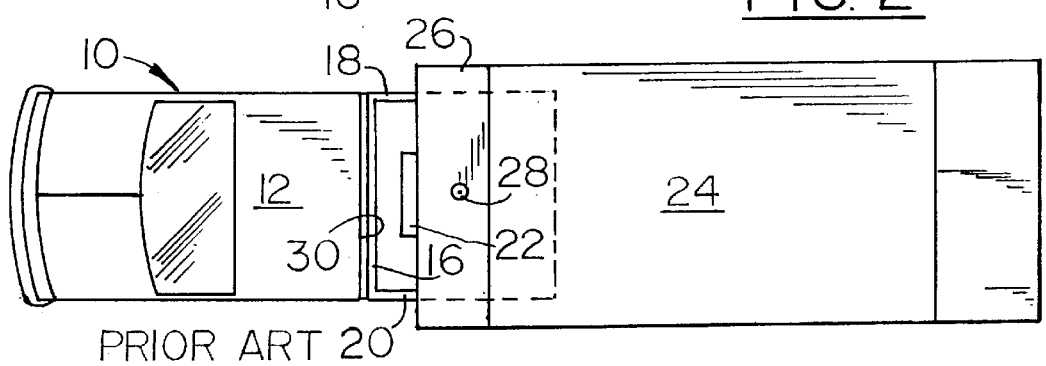

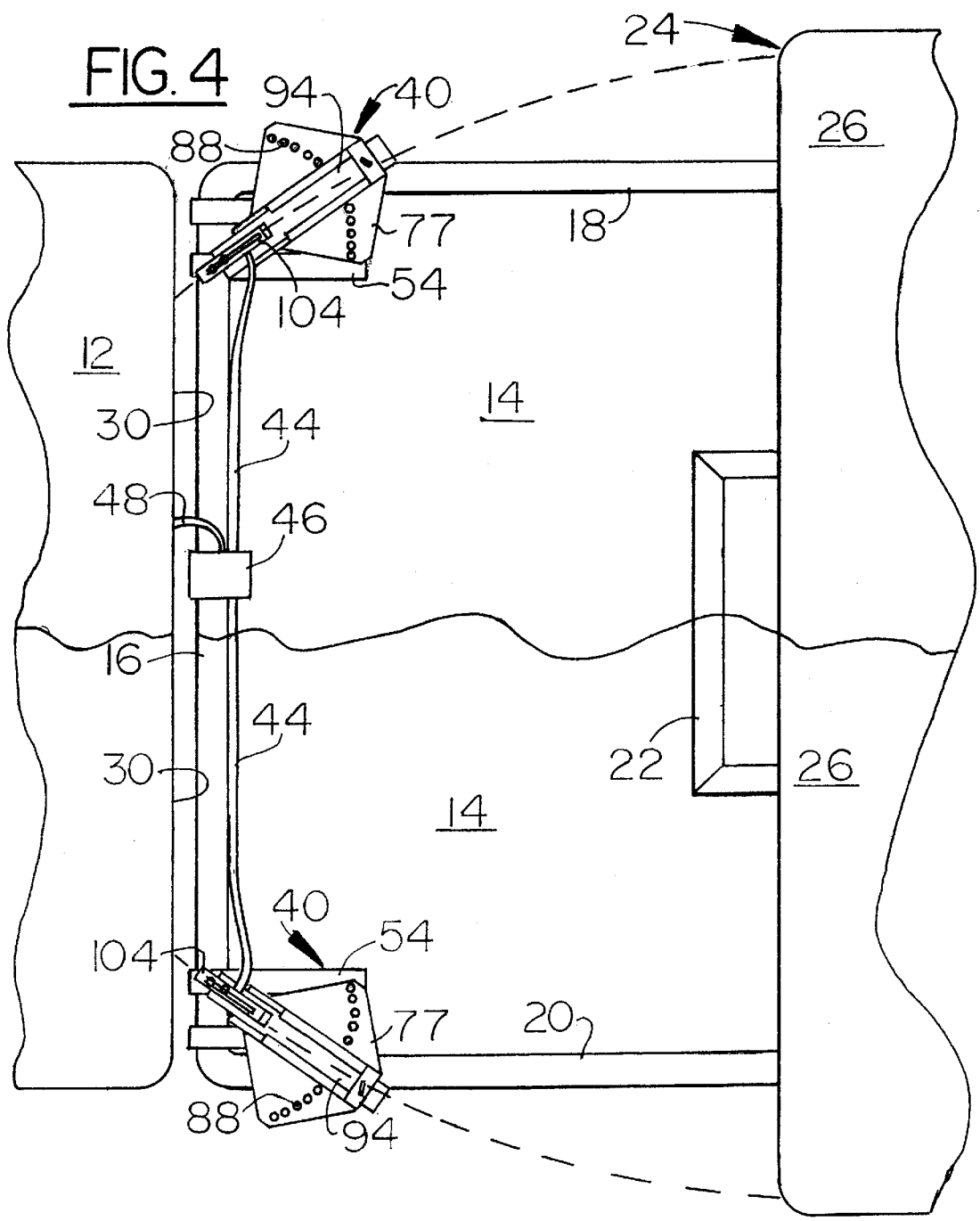

TRUCK TRAILER IMPACT WARNING SYSTEM

FIELD OF THE INVENTION

The present invention relates generally to impact warning systems for truck and trailer combinations, and more particularly to a system for warning the driver of a pick-up truck should the front section of a fifth wheel trailer pivotally supported on a hitch mounted in the bed of the truck approach a point of impact with the cab of the truck during a turning maneuver of the truck and trailer.

BACKGROUND

Over the last several decades, campers and travel trailers have become quite popular with those individuals who enjoy traveling but wish to avoid the inconveniences and well known problems of trying to find available and affordable hotel/motel accommodations at the right locations and at the right times, of locating safe and clean eating and rest facilities along the road, and of having to pack and unpack clothing, food and other personal items on a daily basis. Use of a camper or travel trailer provides individuals with a convenient, affordable, safe and comfortable home away from home wherever they may decide to go, wherever they may choose to stop or camp for sightseeing or rest, whatever the purpose of the trip or however long or short the trip—whether to enjoy an overnight visit to a local lake or forest for fishing or hunting or undertake an extended tour.

Until recent years, the most common travel trailer has been the type which is simply hitched behind and pulled by an automobile or other vehicle. During recent years, however, the combination of a pick-up truck with a fifth wheel trailer has proven to be an increasingly popular and growing alternative. For essentially the same amount of usable interior space, a pick-up truck with a fifth wheel trailer will provide a shorter overall length than the combination of a truck or automobile and the usual pulled travel trailer. Any overall length reduction, of course, will provide distinct advantages not only because of better stability on the road at various speeds and under various road and environmental conditions, but because of increased ease of handling while trying to jockey back and forth into or out of a tight parking area or navigate around a sharp corner.

As is well known to those in the art, in equipping a pick-up truck with a hitch suitable for receipt of the kingpin of a fifth wheel trailer, the hitch must be mounted in the truck bed ahead of the truck's rear axle. Otherwise, if the hitch should be mounted over or to the rear of the rear axle, the weight placed on the hitch by the front section of the trailer will tend to lift the front wheels of the truck off of the road surface and thus cause loss of traction or otherwise interfere with steering ability of the truck, particularly in going over a dip or bump. Any such loss of steering traction, of course, would result in unacceptable safety concerns.

In pick-up trucks with relatively long beds, the necessary positioning of the hitch forwardly of the rear axle normally is not a problem. In the case of a truck with a short bed, however, a complication often will develop as the space forwardly of the hitch may not be sufficient for the front section of the trailer to rotate without impacting on the rear of the truck cab during a sharp turn of the truck-trailer unit. Particularly, in trying to navigate a sharp curve or to jockey a truck and attached fifth wheel trailer back and forth into or from a limited space under poor light conditions, the driver of a short-bed pick-up may not realize that the front section of the trailer is in imminent danger of striking the cab until after a strike and resultant damage to the cab and perhaps also to the trailer have occurred.

While an experienced truck driver might be expected to be cognizant of and thus on guard against an inadvertent impact of the type described above, unfortunately even the experienced truck/trailer owner or user can find it quite difficult to observe the position of the front section of the trailer closely enough to prevent any possible impact with the cab while simultaneously trying to watch both sides of the truck and trailer to avoid trees, buildings, moving people or animals, or other vehicles in trying to back from or enter a tight area or navigate a sharp turn. And for a new or inexperienced driver, such circumstances would almost be assured of generating a problem. Unfortunately, for this reason, many a trip or outing has suddenly and expensively been spoiled.

Short bed trucks are now quite popular as they not only will provide a shorter and more maneuverable vehicle but permit use of an extended cab without an increase in overall vehicle length. Few such trucks are believed purchased specifically for use with a fifth wheel trailer, and even where such use may be anticipated many purchasers do not seem to be aware of the potential trailer impact problem involving a short bed truck. Thus, the problem of potential impact damage when a short bed pick-up truck is combined with a fifth wheel trailer is likely to continue occurring with a high percentage of such trucks.

The above discussed problem of accidental impact between the front section of a fifth wheel trailer and the cab of a pickup truck has been recognized in the past by those in the field, and several proposals have been made for its solution. Examples of such proposed solutions include mechanisms for moving the weight bearing hitch point for the trailer back and forth in the truck bed in response to the need for space during turns, and for shifting the weight bearing point of the hitch rearwardly of the rear axle using a beam or arm projecting rearwardly over the axle. For various reasons, however, none of these prior proposals have met with any significant commercial acceptance or success. Accordingly, until development of the present invention, no truly satisfactory solution to the above discussed impact problem has been advanced.

OBJECTS OF THE INVENTION

Accordingly, it is an object of this invention to provide a system which is usable with any pickup truck to warn the driver of the truck if the front section of a fifth wheel trailer hitched to the bed of the truck is approaching a point of impact with the cab of the truck during a turning maneuver of the truck.

Another object of the present invention is the provision of a warning system of the type described hereabove comprised of components which are readily mounted on any pickup truck at the time a fifth wheel trailer is hitched to such truck and which are readily removed from the truck when the trailer is unhitched from the truck, yet which may be left on the truck after removal of the trailer without danger of damage either to the components or the truck.

A still further object of this invention is to provide a warning system of the type described hereabove comprised of components which may be moved between and mounted on various pickup trucks and which are readily adjustable to assure effective operation when used with various trailers having front sections of various sizes and configurations.

An additional objective of the present invention is the provision of a warning system of the type described above which is simple in design and structure, is inexpensive to produce and maintain, is easy and convenient to use, and is rugged and reliable in operation.

These and other objects, features and advantages of the present invention will be apparent from the following summary and description of the preferred embodiment when taken in conjunction with the accompanying drawings.

SUMMARY OF THE INVENTION

As pointed out hereabove, it is difficult to use one of today's short bed pickup trucks to haul a fifth wheel trailer without running the very real danger of damaging either or both the back of the cab and/or the front section of the trailer as a result of impact between the cab and front section as the unit is maneuvered through sharp turns or into or out of limited spaces. Not only is this currently a real problem, but with the growing popularity of short bed pickup trucks and the increasing use of fifth wheel trailers for travel and camping purposes, the problem can be expected to grow rapidly.

The present invention provides a unique system which not only successfully addresses the need for warning the driver of a truck of an imminent impact problem so that the problem can be averted, but it accomplishes this function in a simple and effective manner using structure which is inexpensive, reliable and easily placed on the truck and adjusted to function properly with any fifth wheel trailer which may be hitched to the bed of the truck.

These and other features and advantages are provided in the present invention by a unique combination of alarm and warning means wherein the warning means comprises a device placed in the cab of the truck and provided with at least one transducer capable of converting an electrical signal into an audible, visible and/or other humanly perceptible event. This warning device may be mounted permanently or semi-permanently in the cab with wiring appropriately routed and hidden, or it may simply be hung temporarily in the cab with wires entering through a window or door opening.

The warning device is activated upon receipt of an electrical signal from the alarm means mounted on the wall of the truck bed proximate the back of the truck cab. As will be explained in more detail hereinafter, while the alarm means may consist of a single device, in the illustrated embodiment it comprises two alarm assemblies removably clamped on the top edge of the front wall of the bed. Each alarm assembly is provided with a mounting member having a generally horizontally disposed upper support plate with a pair of dependent legs straddling the top edge of the front wall. The leg disposed on the inside of the bed carries a threaded clamp which is manually tightened to secure the assembly on the wall. Carried on the upper support plate is a positioning mechanism comprising a first element mounted for limited rotation relative to the support plate and a second element mounted for limited linear movement relative to the first element and the support plate.

Carried on the positioning mechanism is a contact member normally biased in a substantially vertical position. Also mounted on the positioning mechanism is an electrical switch which is operatively engaged with the contact member and which, with appropriate wiring, forms a part of an electrical circuit releasably connected to the power system of the truck and to the transducer(s) of the warning device. The switch normally is held in an open position isolating the transducer(s) from the truck's power system but is movable in response to movement of the contact member to a closed position to connect the transducer(s) to the power system to actuate the transducer(s) and gain the attention of the driver of the truck.

The first and second elements of the positioning mechanism are manually adjustable relative to the support plate and mounting member to move the vertically disposed contact member to a position spaced a predetermined distance from the back of the cab and located at a point where it will intercept the adjacent corner of the front section of the trailer should the corner rotate to that point as the truck and trailer navigate a turn. After the contact member has been positioned properly, the first and second elements are releasably clamped against further movement relative to each other and the mounting member by manually rotatable screw locking members.

It will be understood, of course, that the same positioning and adjusting procedure is to be followed with each of the two alarm assemblies mounted on the front wall of the truck bed whereby both back sides of the truck cab will be protected by the alarm system should the truck driver inadvertently turn too sharply in either direction.

In a preferred embodiment of this invention, the contact member consists of two parts, including a base portion pivoted on the second element of the positioning mechanism and an upper arm portion removably attached to the base portion. As will be understood, this two part structure not only permits easy adjustment of the upper arm portion relative to the base portion but convenient replacement of the upper arm portion with another upper arm portion in the event of damage or in case a different arm length or configuration might be needed for a particular truck-trailer combination.

The switch is carried on a mount plate which is fixed to the second element of the positioning mechanism. The switch includes an operating member resiliently biased into contact with the base portion of the contact member for movement with the contact member between a retracted position in which the switch is held open and an extended position in which the switch is closed. In the closed position, the switch completes an electrical circuit between the truck's power source and the transducer(s) in the warning device to create the alarm signal, indicative of displacement of the contact member from its substantially vertical position as a result of contact with a corner of the front section of the trailer. This alarm signal, of course, would alert the driver of the truck of an impending impact between the back surface of the cab and a corner of the trailer's front section in time to reduce the turning radius and thus avoid the potential impact problem.

While it would be possible to provide a warning device as a part of each of the two alarm assemblies used in the system discussed above and to mount both devices within the cab of a truck being fitted with a warning system according to this invention, it is preferred that only one warning device be used. Accordingly, in preparing the electrical wiring for the circuit to be used in the present system, the warning device preferably is not "hard" wired with the switch of either alarm assembly, but rather is connected with the switches either through appropriate plugs and receptacles or indirectly through common lines from a connection box located outside of the cab. Connection with the power system of the truck may then be made using a plug sized to fit into the usual cigarette lighter receptacle or other convenient means of removably connecting the warning system to the truck's power source.

As pointed out hereabove, the present invention is not limited to a warning system utilizing two separate alarm assemblies as the alarm means may comprise a single unit which extends across the front wall of the bed of a pickup truck. In this event, the unit preferably would have a centrally located switch and a contact member mounted at each end of the unit on an appropriate positioning mechanism, with the contact members being mounted on a common pivot bar or like element whereby movement of either contact member in response to contact with the front section of a trailer would operate the switch to activate the warning device to alert the driver of an imminent problem.

It should be pointed out that throughout the specification and claims of this application, the words "front" and "forward" and terms of similar import are to be taken as meaning a direction oriented generally toward the front end of a truck, and the words "back," "rear," "rearward" and terms of similar import are to be taken as meaning a direction oriented generally toward the back end of a truck.

BRIEF DESCRIPTION OF THE DRAWINGS

FIG. 1 is a perspective view of a short bed pickup truck hitched to a fifth wheel trailer according to the prior art;

FIG. 2 is a top plan view of the short bed pickup truck and fifth wheel trailer prior art combination of FIG. 1 showing the trailer being pulled in a straight line;

FIG. 3 is a top plan view of the short bed pickup truck and fifth wheel trailer prior art combination of FIG. 1, showing a corner of the front section of the trailer at the point of impact with the cab during a turning maneuver of the truck;

FIG. 4 is a partial top plan view of the mid-portion of the truck and trailer combination of FIGS. 1–3, including the back of the truck cab, the forward portion of the truck bed and the front section of the fifth wheel trailer, showing placement and positioning of alarm assemblies of a warning system according to the present invention;

DESCRIPTION OF THE PREFERRED EMBODIMENT

Figure 5:
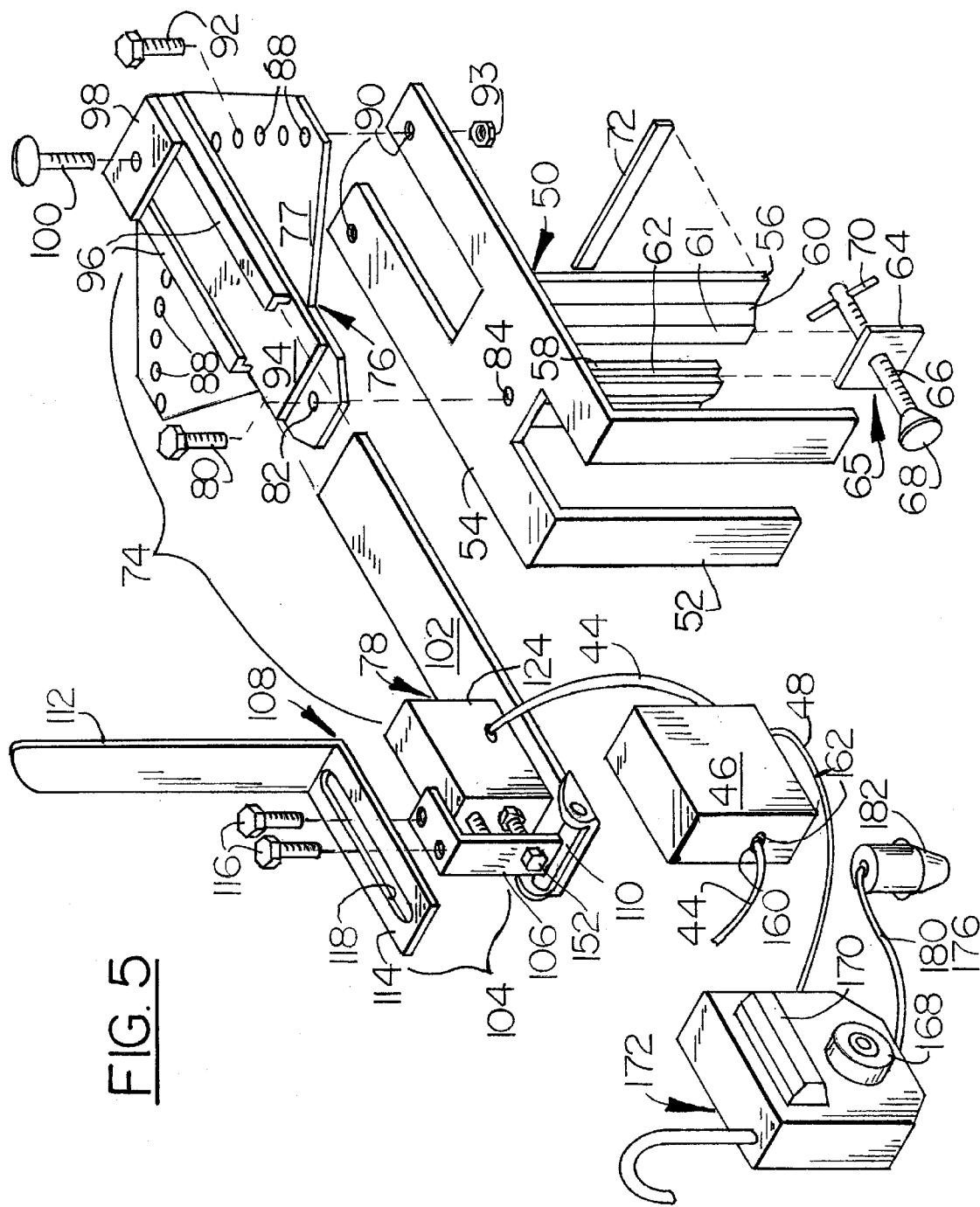
FIG. 5 is a side view in perspective of an exploded alarm assembly and a warning device pursuant to the system embodiment of FIG. 4.

Continuing now with a more detailed description of the drawings, reference is first made to FIG. 1 showing in perspective a short bed pickup truck 10 having the usual closed cab 12 and rearwardly extending bed 14, including upwardly extending front wall 16 and side walls 18 and 20. Secured in bed 14 is a standard fifth wheel hitch 22, such as a Reese 15K or 20K model, on which a fifth wheel trailer 24 having the usual forwardly extending front section 26 is pivotally supported by the usual kingpin 28 (see FIGS. 2 and 3). The hitch 22 is positioned in bed 14 such that the weight exerted thereon by the front section 26 is positioned a short distance forwardly of the rear axle (not shown) of truck 10. As pointed out hereinabove, such positioning of the hitch is vital to assure that the trailer weight exerted on truck 10 through hitch 22 has no detrimental affect on the truck's steering characteristics.

Referring now to FIG. 2, it will be seen that the distance between the rear surface 30 of cab 12 and front section 26 of trailer 24 is quite limited, being substantially less than the distance between kingpin 28 and either corner of front section 26. As will be apparent, this difference in distances does not create a problem so long as the truck 10 and trailer 24 continue on a straight or substantially straight path. As the longitudinal axes of the truck 10 and trailer 24 increasingly diverge during a sharp turn or other maneuver, however, front section 26 of trailer 24 will rotate around kingpin 28 to a point, such as that illustrated in FIG. 3, where a corner of front section 26 will impact rear surface 30 of cab 12. Even if such an impact should be noticed immediately by the driver, the chances are high that damage will have occurred both to the cab 12 and front section 26 before the driver can take corrective action by increasing the turning radius. As will be appreciated, the cost of repairing damage of the magnitude which might occur as a result of an impact of the nature just described, can be surprisingly expensive. The present invention is directed to a system for resolving this problem.

Referring now to FIG. 4, it will be seen that mounted on front wall 16 adjacent side walls 18 and 20 are two alarm assemblies 40. As will be pointed out in more detail herebelow, these two assemblies are substantially identical in construction, purpose and operation, together constituting an alarm means forming part of a warning system designed to alert the driver of truck 10 should either corner of front section 26 of trailer 24 approach a point of impact with the back 30 of cab 12 as the truck and trailer are maneuvering through a turn. Each alarm assembly 40 includes an electrical switch 42 (see FIG. 8) connected by a wire set 44 with a central junction box 46 which in turn is connected through feed wires 48 with warning means located within the cab 12.

FIG. 4 shows the alarm assemblies 40 as being positioned at the outer ends of front wall 16 in order to provide for proper interception of the corners of front section 26 as they rotate toward the back of the cab during turns. It will be understood, however, that with other truck/trailer combinations and pivot point differences, the alarm assemblies 40 may need to be positioned on the front wall of the bed at some distance inwardly from its outer ends. Thus, as the alarm assemblies are being mounted on a truck having a fifth wheel trailer hitched to the bed, one should be cognizant of the need to position the alarm assemblies where they will properly intercept the corners of the front section of that particular trailer as the truck maneuvers through sharp turns.

Referring now to FIG. 5, wherein an assembly 40 is illustrated in an exploded view, attention is first called to mounting means or member 50 comprising a substantially "L" shaped member formed of steel or other rigid material with a downwardly depending front leg 52 and a generally horizontally disposed upper support plate 54. Welded or otherwise attached to the bottom side of support plate 54 in a spaced generally parallel relationship with front leg 52 is rear leg 56. As will be noted, rear leg 56 includes a centrally disposed slit 58 extending downwardly from support plate 54, and on each side of the slit 58 is a guide piece 60 having an outer section 61 spaced a short distance from the adjacent surface of leg 56. On each side of the slit, the space between leg 56 and outer section 61 forms a groove 62, and these two grooves 62 cooperatively provide a guide for slidably supporting the rectangular clamp plate 64 of clamp assembly 65 for movement vertically relative to support plate 54. Threaded through clamp plate 64 is a screw member 66 having on one end an enlarged pressure foot 68 and on the other end a transversely extending handle bar 70. After clamp plate 64 has been inserted in grooves 62, stop bar 72 preferably is positioned across the bottom of and bolted, welded or otherwise attached to leg 56 to prevent later inadvertent loss of clamp plate 64 from grooves 62.

Figure 7:
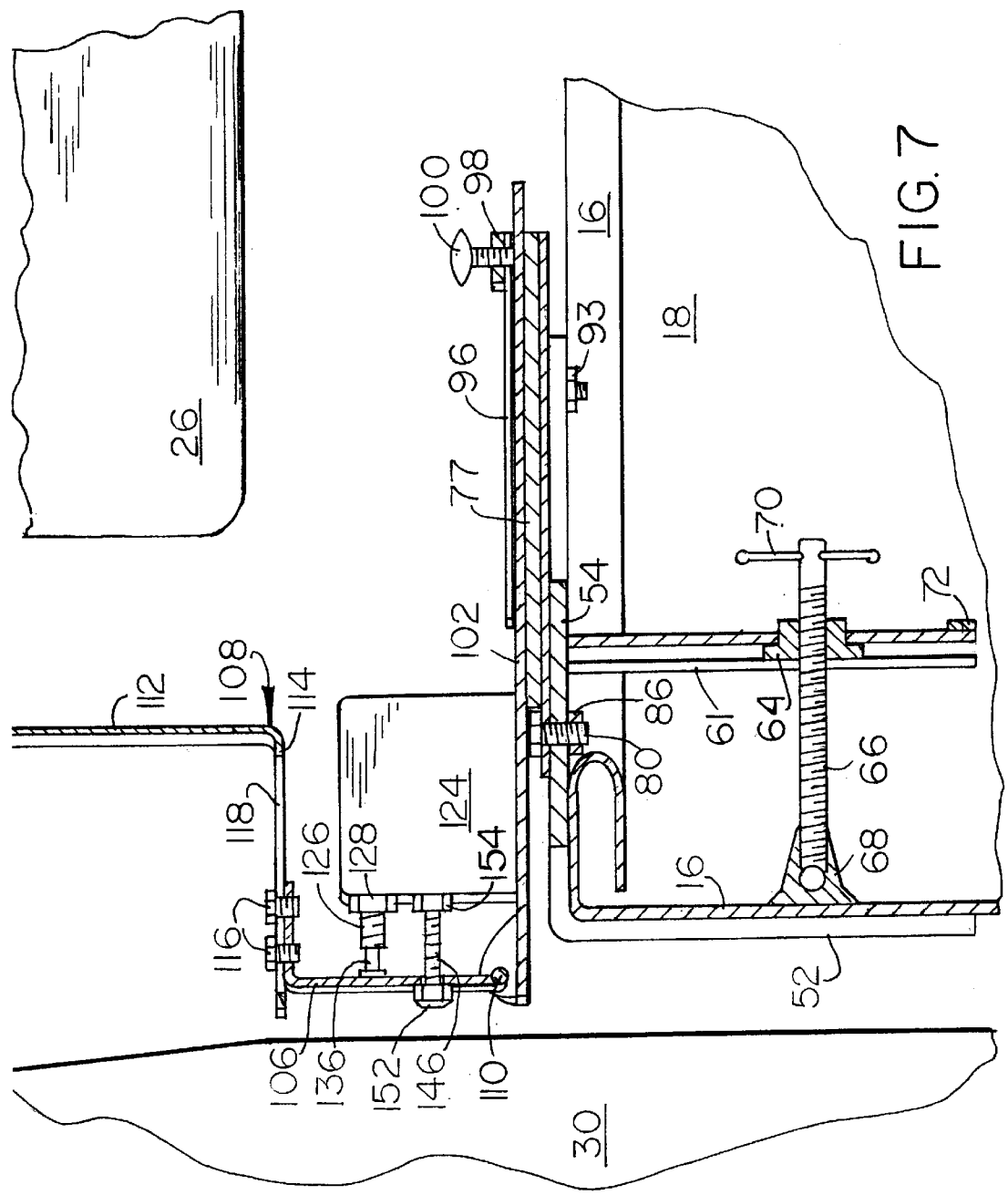
FIG. 7 is a side view, partially in cross section, showing an alarm assembly according to the present invention as clamped on the top edge of the front wall of the bed of the truck of FIG. 4, including a corner of the front section of the fifth wheel trailer partially rotated.

As best noted from FIG. 7, the spacing between dependent legs 52 and 56 is sufficient to permit convenient placement of mounting member 50 in a straddling position over the relatively wide bead or turned over edge normally provided at the top of the upwardly extending walls positioned around the bed of the usual pickup truck. After placement of the mounting member over the top of wall 16 as illustrated, the clamp assembly 65 may then be moved vertically in grooves 62 to position pressure foot 68 over a flat clear surface on wall 16, and the screw member 66 then turned manually using handle bar 70 to clamp wall 16 between front leg 52 and the pressure foot 68.

Positioning means comprising a positioning mechanism 74 is disposed on support plate 54, this mechanism comprising a first element 76 and a second element 78. The somewhat wing shaped base 77 of first element 76 is formed of a generally flat sheet material and pivoted on support plate 54 for limited rotary movement around a pivot formed by a threaded pivot pin 80 which extends through an aperture 82 adjacent the inner or forward end of the first element and a matching aperture 84 in support plate 54. Pivot pin 80 should be pulled sufficiently snug by nut 86 (see FIG. 7) to prevent wobbling or other undesired movement of element 76 on support plate 54, while still permitting manual rotation therebetween using reasonable pressure.

Formed in the outwardly extending wings of base 77 are a series of latch holes 88 arranged in a circular arc centered around pivot pin 80. Also centered around pivot pin 80 are a pair of lock holes 90 in support plate 54. Latch holes 88 and lock holes 90 are spaced the same distance from pivot pin 80, whereby first element 76 may be rotated to any of a variety of positions in which one of the latch holes 88 and lock holes 90 are aligned, and then locked into place by insertion of bolt 92 through the aligned holes. Lock holes 90 may be threaded to receive and secure bolt 92 without the use of a separate nut, but such a nut 93 may be used if so desired. Also, to further assure against inadvertent loosening of bolt 92, a lock washer preferably should be used. By use of at least two widely spaced lock holes 90 and a greater number of latch holes 88, the first element 76 can be rotated to and secured in any of a variety of positions as might be needed to accommodate mounting of the alarm assembly 40 on various truck and trailer combinations. In the illustrated embodiment, a total of ten latch holes 88 and two lock holes 90 are shown, but it will be understood that different numbers of either type of hole might be appropriate or desired.

Also, it should be noted that the two series of latch holes 88 in base 77 could be replaced by two curved slots which would permit rotation of the first element 76 merely by loosening and not removing bolt 92 from lock hole 90. For security reasons, however, individual latch holes are preferred as there is considerably less danger of inadvertent shifting of first element 76 should bolt 92 become loosened but remain in place.

Secured on base 77 is an elongate flat member 94 carrying a pair of parallel spaced guide rails 96, the member 94 and rails 96 being parallel to a line extending radially from aperture 82 and bisecting base 77. Across the rearward or outer end of guide rails 96 is a stop 98 containing a threaded set screw 100. The second positioning element 78 comprises an elongate bar 102 which is snugly but slidably received in the track formed on the first positioning element 76 by the guide rails 96. In length, bar 102 should be long enough to remain under stop bar 98 while still accommodating whatever linear movement is necessary to permit proper adjustment of the positioning mechanism 74 after the alarm assembly 40 has been placed on a truck. As will be obvious, manually operated set screw 100 is provided for locking bar 102 against further movement after it has been properly positioned.

Contact means 104, carried on second positioning element 78, preferably comprises a two part assembly consisting of a base portion 106 and an upper arm portion 108. The base portion 106 is mounted on and rotatable around a pivot 110 located proximate the forward end of bar 102, with the upper arm portion 108 being releasably mounted on base portion 106. As will be noted particularly from FIGS. 5 and 7, Upper arm portion 108 is a substantially "L" shaped member, with a vertically disposed upper section 112 and a horizontally disposed lower section 114 mounted on base portion 106 by bolts 116. Lower Section 114 includes an elongate slot 118 which permits horizontal linear adjustment of upper arm portion 108 relative to base section 106 as part of the positioning of contact member 104 after alarm assembly 40 has been mounted on the bed wall. In addition to the linear movement permitted by slot 118, by temporarily removing one of the bolts 116, the upper arm portion 108 can be reversed 180° to permit even greater flexibility in adapting alarm assembly 40 to a particular truck/trailer combination. Also, of course, as it is readily removed, upper arm portion 108 is easily replaced in case of damage or should an arm 108 of a different height or configuration be needed to accommodate a particular situation.

Figure 8:
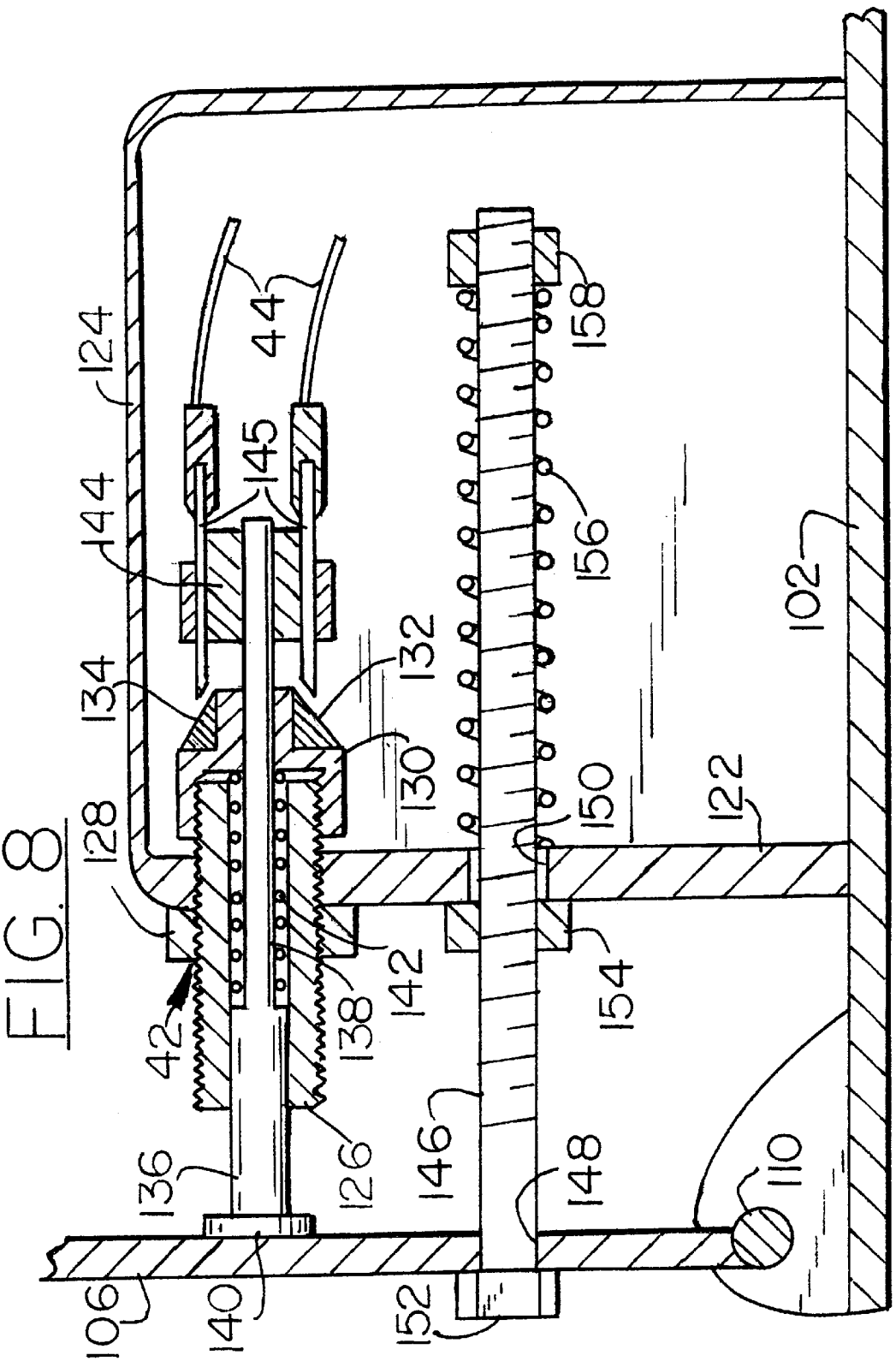
FIG. 8 is an enlarged partial side elevational view in cross section of the switch assembly of the embodiment of FIGS. 4–7.

Turning now to FIG. 8, it will be noted that switch means 42 comprises an assembly carried on mount plate 122, which mount plate extends upwardly from bar 102 and forms a part of a switch enclosure 124 affixed to bar 102 a short distance rearwardly of pivot 110. Switch 42 includes a tubular guide sleeve 126 threaded through mount plate 122, with its ends projecting forwardly and rearwardly from the mount plate 122. Threaded on the forwardly projecting end of guide sleeve 126 is locking nut 128, and disposed on the rearwardly projecting end is stop nut 130. If guide sleeve 126 is formed of plastic or other electrically non-conductive material, stop nut 130 may be made of a conductive material and provided with a rearwardly facing tapered circular surface 132. Otherwise, if the guide sleeve 126 is metallic or otherwise conductive in nature, stop nut 130 should be formed of a non-conductive material and provided with an electrically conductive metallic ring 134 which includes the tapered surface 132 and which is electrically isolated from the guide sleeve 126 and all other conductive components of the switch 42.

Slidably disposed in and projecting forwardly of guide sleeve 126 is an elongate cylindrical operating member 136 having a reduced rearward section 138 slidable through and projecting rearwardly of stop nut 130. On its forward outer end, operating member 136 is provided with a circular pressure foot 140 which normally is resiliently biased into operative contact with base 106 of contact member 108. This biasing action is a result of pressure generated by a coil spring 142 mounted on the reduced rearward section 138 of operating member 136 and compressed between a forwardly facing internal seat on stop nut 130 and the rearwardly facing shoulder formed on operating member 136 at the point where it's diameter is reduced to form the rearward section 138.

Affixed to the outer end of reduced rearward section 138 is a non-conductive contact holder 144 supporting two electrical terminals 145 which are normally isolated from each other and spaced from tapered surface 132. Attached to terminals 145 are flexible connecting wires 44 which form a part of the electrical circuitry of the warning system as described in further detail herebelow.

As will be understood from the foregoing discussion, while contact member 104 normally is to be held in a generally vertical position, it must be capable of yielding by rotation around pivot 110 when impacted by a corner of the front section 26 of trailer 24. In the present embodiment, such positioning and rotary movement are accommodated by use of an elongate positioning member 146 which extends through aligned openings 148 and 150 in base 106 and mount plate 122, respectively. As will be seen particularly from FIG. 8, positioning member 146 includes on its forward outer end an enlarged head 152 which engages the outer surface of the base 106, and a nut-like spacer 154 which is threadedly adjustable on positioning member 146 for engagement with the forward or outer surface of mount plate 122. Disposed on the rearward end of positioning member 146 within switch enclosure 124 is a coil spring 156 which is compressed between the inner or rearward surface of mount plate 122 and a nut 158 threaded on the rearward end of positioning member 146. As will be obvious, the pressure exerted by spring 156 will pull positioning member 146 and contact member 104 rearwardly until adjustable spacer 154 abuts against mount plate 122. Spacer 154, of course, should then be adjusted by rotating it in one direction or another as necessary to position contact member 104 in a generally vertical position.

After contact member 104 has been properly positioned, guide sleeve 126 of switch 42 should then, if necessary, be adjusted relative to mount plate 122 to move pressure foot 140 of operating member 136 into engagement with base 106 with sufficient pressure to space terminals 145 a short distance rearwardly of and out of contact with the tapered surface 132 of metallic ring 134. In the absence of pressure against base 106, spring 142 will bias operating member 136 forwardly until terminals 145 engage tapered surface 132 of metallic ring 134. Such engagement will "close" switch 42 by establishing a direct electrical path between connecting wires 44 through terminals 145 and ring 134. In this connection, it will be understood that spring 156 on positioning member 146 should have greater strength than spring 142 on operating member 136 to insure that pressure exerted on contact member 104 by pressure foot 140 does not move contact member 104 from its generally vertical position.

As will be clear from FIG. 8, rotation of base 106 of contact member 104 forwardly away from mount plate 122, will pull positioning member 146 forwardly through opening 150 in contravention to the pressure of spring 156 and if such movement is of any significant amount, the operating member 136 of switch 42 will be biased forwardly enough by spring 142 to bring terminals 145 into engagement with ring 134. As pointed out previously, such engagement will "close" switch 42 to create a direct conductive path between the connecting wires 44.

Figure 6:
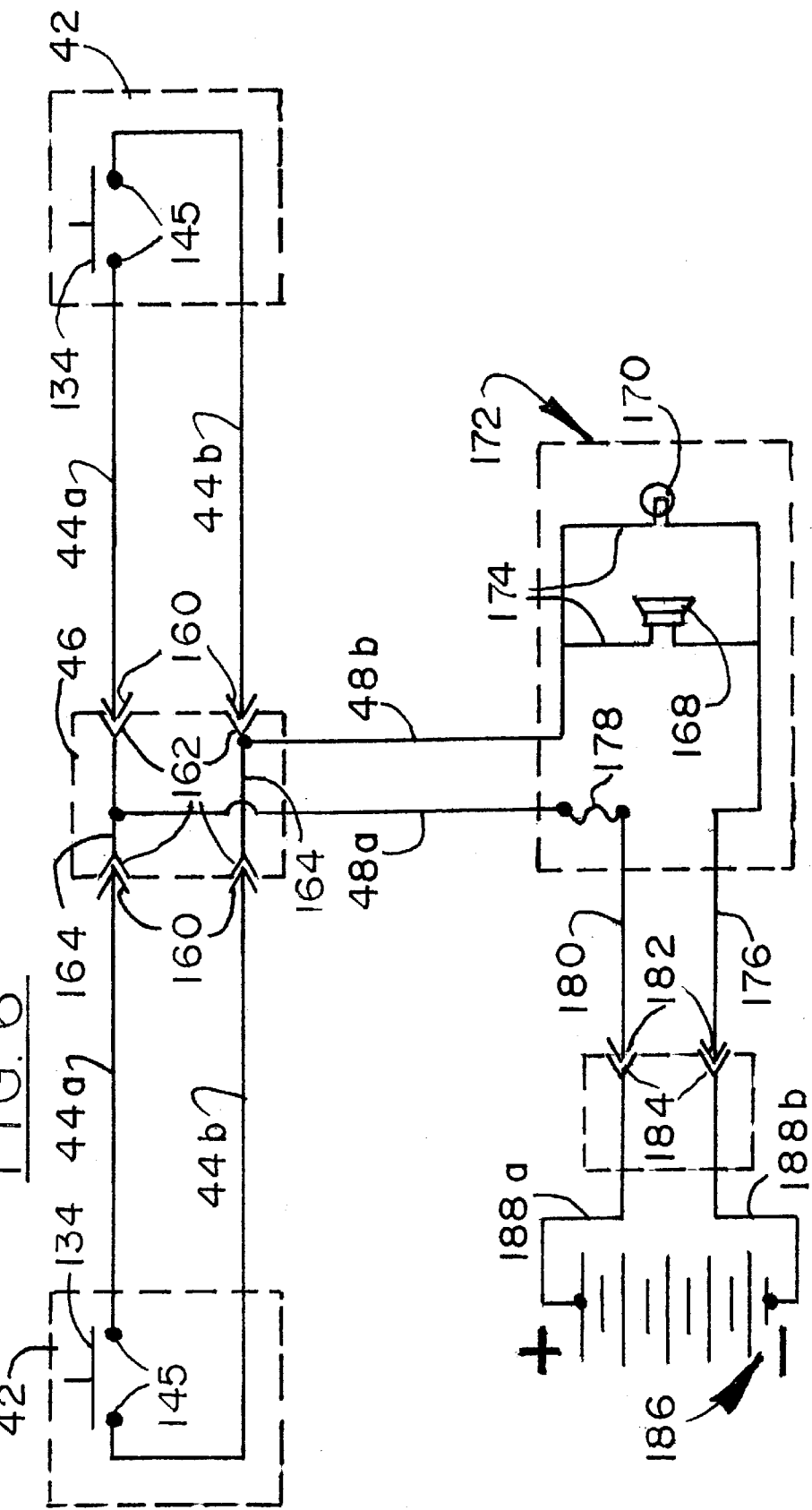
FIG. 6 is a schematic showing in detail the electrical circuit used to operate the warning device of the embodiment of FIGS. 4 and 5.

As will be noted particularly from FIG. 6, the wire sets 44 connected to the switch 42 of each of the two alarm assemblies 40 mounted on the front wall 16 of truck 10 preferably are terminated in plugs 160 which are removably received in receptacles 162 in junction box 46 mounted centrally on the bed wall 16. Within the junction box 46, the receptacles 162 are connected by jumpers 164 which in turn are connected to feed wires 48. As indicated heretofore, feed wires 48 are connected to one or more transducers, such as buzzer 168 and flashing light 170, in warning device 172. In any event, warning device 172 may be hung on a knob or otherwise placed within the cab 12 of the truck 10 where it easily can be heard or seen or otherwise readily detected, with feed wires 48 being run through a convenient window or door opening. One advantage of using a central junction box 46 and detachable connecting wires 44, is that the alarm assemblies 40 may conveniently be removed from the truck while it is not being used to pull a trailer without also having to remove the junction box 46, warning device 172 and feed wires 48.

Particularly from FIG. 6, it will be noted that within warning device 172, the buzzer 168 and light 170 are connected in parallel by wires 174 which terminate at one end with one of the wires 48 and at the other end with wire 176. The other wire 48 connects with a fuse 178 which in turn connects with wire 180. Wires 180 and 176 connect to a plug 182, which preferably is adapted for removable reception in a receptacle 184 such as the usual cigarette lighter receptacle found in most modern day vehicles. Receptacle 184 is then connected with the truck's electrical battery 186 through wires 188.

Still referring to FIG. 6, it will be seen that if either switch 42 should be closed as a result of contact between terminals 145 and ring 134, electrical current will flow from the positive terminal of battery 186, through wire 188*a*, receptacle 184, plug 182, wire section 180, fuse 178, feed wire 48*a*, jumper 164, receptacle 162, plug 160, connecting wire 44*a*, and closed switch 42. Current will then continue from closed switch 42 through connecting wire 44*b*, feed wire 48*b*, parallel wires 174 and transducers 168 and 170, wire 176, plug 182, receptacle 184, and wire 188*b* into the negative terminal of battery 186. As will be understood, the flow of current through transducers 168 and 170 will activate these devices to generate a loud buzz or bright flashing light and thus gain the attention of the driver. As will be understood by those familiar with electrical theory, electron flow through the above described system will, of course, run from the negative to the positive battery terminal—just the opposite of the current flow.

Describing briefly the application and use of the preferred embodiment, it will be seen from FIG. 4 that with a pickup truck having a short bed 14 containing a hitch 22 pivotally supporting a fifth wheel trailer 24, an alarm assembly 40 is to be mounted on each outer edge of the front wall 16 of the bed 14. As best shown in FIG. 7, the alarm assemblies 40 are disposed on wall 16, with dependent legs 52 and 56 of mounting member 50 straddling the upper edge of the wall. After being placed on the wall, the assemblies 40 are clamped in position by manual rotation of screw member 66 using handle bar 70 to clamp wall 16 between pressure foot 68 and front leg 52. The junction box 46 should then be clamped on the front wall 16 at approximately its mid point, and plugs 60 at the ends of connecting wires 44 snapped into receptacles 162 of junction box 46.

If the truck cab 12 includes a sliding rear window, the warning device 172, plug 182 and feed wires 48 from junction box 46 preferably are run through the window, the plug 182 inserted into a cigarette lighter or like receptacle 184, and the warning device hung on a knob or otherwise placed in the cab 12 where it's transducers, if activated, will be seen and/or heard easily by the truck driver. Should a sliding rear window not be available, the warning device 172, plug 182 and feed wires 48 can be routed with care through one of the side windows or door openings. Or if the warning system is to be used regularly on the same truck, the wires 48 preferably may be routed into the cab 12 through an inconspicuous protected opening and concealed under the floor mat or upholstery, the warning device attached directly to the dash or ceiling, and the plug 182 left in receptacle 184 but pulled back to break the connection with the battery 186 when the warning system is not needed.

After the various components of the system have been mounted, the position and location of contact member 104 of each alarm assembly 40 should then be checked to ensure that its upper arm 112 is properly positioned between the rear surface 30 of cab 12 and the front section 26 of trailer 24.

If the verticality of upper arm 112 of contact member 104 is found to be in need of adjustment, such action can be accomplished by rotating spacer 154 on positioning member 146 in a direction appropriate either to let spring 156 draw the base 106 of contact member 104 toward mount plate 122 or to free base 106 for movement away from mount plate 122, loosening lock nut 128 on guide sleeve 126 of switch 42, rotating guide sleeve 126 in a direction appropriate to move pressure foot 140 of operating member 136 against base 106 with enough force to (i) push base 106 outwardly until abutting against head 152 of positioning member 146 and (ii) space terminals 145 of switch 42 a short distance rearwardly of ring 134, and finally re-tightening lock nut 128.

After completing any necessary vertical positioning of upper arm 112 as described above, the contact member 104 must then be moved to a point where it's upper section 112 will intercept the adjacent corner of the trailer's front section 26 should that corner rotate to a point where any significant additional rotation would result in an impact with and damage to the rear surface 30 of cab 12 during a sharp turn of the truck 10. Such adjustment is accomplished through use of the positioning mechanism 74 provided in each alarm assembly 40. The first step is to manually rotate first element 76 on support plate 54 around pivot pin 80 to position upper arm 112 at the desired position between the back 30 of cab 12 and the front section 26 of trailer 24. As will be understood, and as indicated by FIG. 4, it will be necessary to rotate the first elements 76 of the assemblies 40 in opposite directions to point outwardly at opposite angles toward opposite corners of the front section 26 of trailer 24. After being positioned in this manner, the first element 76 may have to be shifted slightly to align one of it's latch holes 88 in base 77 with a lock hole 90 in support plate 54 to permit insertion of a bolt 92 through the aligned latch and lock holes 88 and 90 and placement of nut 93.

The final positioning of upper arm 112 of contact member 104 is accomplished simply by sliding flat bar 102 of second element 78 along guide rails 96 until the upper arm 112 is located a short distance from the rear surface 30 of cab 12, and then manually tightening set screw 100 to lock bar 102 in place. While the exact distance needed for proper protection of cab 12 may vary, depending upon the truck-trailer combination and the personal preference of the person setting up the system, a distance in the range of 4" to 5" has been found adequate. Normally, the switch 42 will close and the transducers 168 and 170 activate after the upper end of the contact member 104 has rotated perhaps ½" to 1" in response to pressure from a corner of the trailer's front section 26. This will leave an additional space of approximately 3" to 4½" for movement of the contact member 104 and trailer corner after activation of the alarm and before contact might occur with the back 30 of cab 12—a distance which should be more than adequate for the truck driver to respond to the alarm by increasing the radius of the turn then underway and thereby avoid any possible problem.

It will be understood that after the above described warning system has been installed, properly adjusted and connected to the electrical system of a short bed truck on which a fifth wheel trailer is hitched, the driver will not thereafter have to be concerned about accidental damage to the truck or trailer while maneuvering through sharp turns or jockeying into or out of tight or small areas. He or she will instead be able to concentrate wholly on safety and driving, knowing that a clear warning will be generated automatically and in time for corrective action should too sharp a turn be in progress.

Obviously, many modifications and variations of the present invention are possible in light of the teachings of this application. For instance, as briefly mentioned above, the two alarm assemblies could be combined into one unit adapted to be mounted across the front of the truck bed. It is to be understood, therefore, that the foregoing descriptions and appended drawings are illustrative only and are neither intended nor desired to limit the scope of this invention.

I claim:

1. A system removably mounted on a truck of the type having a bed provided with an upwardly extending peripheral wall, the system warning the driver of the truck should the forward extension of a fifth wheel trailer pivotally supported on a hitch secured in the bed of the truck approach a point of impact with the cab of the truck during a turning maneuver of the truck, the warning system comprising warning means positioned within the cab, said warning means being operable to gain the attention of the driver, alarm means comprising mounting means removably mounted on the upwardly extending peripheral well of the bed of the truck externally of and proximate the cab, posltioning means supported on said mounting means, contact means provided on said positioning means for limited movement thereon, switch means operable upon movement of said contact means to activate said warning device, said positioning means being manually adjustable relative to the cab to position said contact means between the cab and the forward extension for engagement with such forward extension at a predetermined distance from the point of impact, said contact means being moved and operating said switch to activate said warning device to gain the attention of the driver in response to contact between said contact means and the forward extension should such forward extension rotate beyond said predetermined distance during a turning maneuver of the truck.

2. A system according to claim 1, characterized by said mounting means comprising a mounting member removably mounted on the peripheral wall, said positioning means comprising a positioning mechanism supported on said mounting member, said contact means comprising a generally vertically disposed contact member provided on said positioning mechanism for limited pivotal movement thereon, said switch means comprising a switch operable upon pivotal movement of said contact member to activate said warning means, said positioning mechanism being adjustable relative to the mounting member to position said contact member between the cab and the forward extension for engagement with such forward extension at a predetermined distance from the point of impact, said contact member being moved and operating said switch to activate said warning device to gain the attention of the truck driver in response to contact between such contact member and the forward extension upon movement of such forward extension beyond said predetermined distance during a turning maneuver of the truck.

3. A system according to claim 2, wherein the upwardly extending peripheral wall comprises front and side sections, characterized by said mounting member being disposed on the top edge of the front section and provided with a generally horizontally disposed support plate, and said positioning mechanism being mounted on and manually adjustable both rotatably and linearly relative to said support plate to permit selective positioning of said contact member at said predetermined distance.

4. A system according to claim 3, characterized by said positioning mechanism comprising a first element mounted for limited rotary movement relative to said support plate, a second element mounted for limited linear movement relative to said first element and said support plate, and manually operable restraining means for selectively restraining said first and second elements against movement relative to each other and to said support plate after said contact member has been moved by said positioning mechanism to said predetermined distance.

5. A system according to claim 4, wherein said positioning mechanism is further characterized by said first element being pivoted on said support plate for limited rotation thereon, said second element being slidable on said first element for limited linear movement thereon, said first element being rotatable relative to said support plate and said second element being linearly slidable on said first element to permit manual selective placement of said contact member at said predetermined distance.

6. A system according to claim 5, wherein said support plate is provided with a pair of spaced generally parallel dependent legs straddling the top edge of the front wall section, and manually operable means carried by one of said legs for removably clamping said support plate at a manually selectable height on said front wall section.

7. A system according to claim 6, characterized by said contact member being mounted on said second element for limited pivotal movement thereon, said switch being mounted on said second element and provided with a operating member adapted to move with said contact member between a position in which said switch is inoperative and a position in which said switch is operative, and resilient means normally biasing said contact member to its generally vertical position and said operating member to its inoperative position.

8. A system according to claim 7, wherein the truck provides an electrical power source, characterized by said warning device comprising transducer means for converting an electrical signal into a humanly discernible event, an electrical circuit
removably connected to the power source and extending between said switch and said transducer means, said contact member and said operating member being moved to close said switch in response to contact between said contact member and the forward extension upon rotary movement of such forward extension beyond said predetermined distance during a turning maneuver of the truck, said closure connecting said transducer means to said power source to activate said transducer to create said discernible event.

9. A system according to claim 1, wherein the truck has a bed provided with an upwardly extending peripheral wall having front and side sections, characterized by said warning means being positioned within the cab and said alarm means comprising a pair of alarm assemblies spaced apart on the front wall section, each said alarm assembly being characterized by said mounting means comprising a mounting member removably mounted on the front wall section, said positioning means comprising a positioning mechanism supported on said mounting member, said contact means comprising a generally vertically disposed contact member provided on said positioning mechanism for limited pivotal movement thereon, said switch means comprising a switch operable upon pivotal movement of said contact member to activate said warning means, said positioning mechanism being adjustable relative to the mounting member to position said contact member between the cab and the forward extension for engagement with such forward extension at a predetermined distance from the point of impact, said contact member being moved and operating said switch to activate said warning device to gain the attention of the truck driver in response to contact between such contact member and the forward extension upon rotary movement of such forward extension beyond said predetermined distance during a turning maneuver of the truck.

10. A system according to claim 9, wherein the forward extension includes forward outer corners and each said alarm assembly is characterized by said mounting member being disposed on the top edge of the front section proximate one end thereof and provided with a generally horizontally disposed support plate, and said positioning mechanism being mounted on said support plate and comprising a first element mounted for limited rotary movement relative to said support plate, a second element mounted for limited linear movement relative to said first element and said support plate, and manually operable restraining means for selectively restraining said first and second elements against movement relative to each other and to said support plate after said contact member has been moved by said positioning mechanism to said predetermined distance.

11. A system according to claim 10, wherein said positioning mechanism of each said alarm assembly is further characterized by, said first element being pivoted on said support plate for limited rotation thereon, said second element being slidable on said first element for limited linear movement thereon, said first element being rotatable relative to said support plate and said second element being linearly slidable on said first element to permit manual selective placement of said contact member at said predetermined distance.

12. A system according to claim 11, wherein each said alarm assembly is characterized by
   said support plate being provided with
      a pair of spaced generally parallel dependent legs straddling the top edge of the front wall section, and
      manually operable means carried by one of said legs for removably clamping said support plate at a manually selectable height on said front wall section,
   said contact member being mounted on said second element for limited pivotal movement thereon,
   said switch being mounted on said second element and provided with an operating member adapted to move with said contact member between a position in which said switch is inoperative and a position in which said switch is operative, and
   resilient means normally biasing said contact member to its generally vertical position and said operating member to its inoperative position.

13. A system according to claim 12, wherein the truck provides an electrical power source, characterized by
   said warning device comprising a transducer means for converting an electrical signal into a humanly discernible event,
   an electrical circuit
      removably connected to the power source and
      extending between said switches and said transducer means,
   said contact member and said operating member of one of said alarm assembles being moved to close the switch of said one assembly in response to contact between said contact member and one of the forward outer corners upon rotary movement of such corner beyond said predetermined distance during a turning maneuver of the truck, said switch closure connecting said transducer means to said power source to activate said transducer to create said discernible event.

14. For use with a pick-up truck having a cab, a bed extending rearwardly of the cab and providing an upwardly extending peripheral wall with front and side sections, and an electrical power source,
   a warning system removably mounted on the truck for warning the driver of the truck should one of the forward outer corners of a fifth wheel trailer pivotally supported on a hitch secured in the bed of the truck approach a point of impact with the cab during a turning maneuver of the truck, said warning system comprising
      a warning device disposed within the cab and comprising at least one transducer for converting an electrical signal into an audio and/or visible and/or other event readily discernible by the driver,
      a pair of alarm assemblies spaced apart on the front wall section, each of said alarm assemblies comprising
         a mounting member positioned on the front wall section and provided with
            a generally horizontally disposed support plate,
            a pair of spaced generally parallel legs depending from said support plate and straddling the top edge of the front wall section, and
            a manually operable screw member for removably clamping said mounting member on the front wall section,
         a positioning mechanism carried on said mounting member and comprising
            a first element pivoted on said support plate for limited rotary movement thereon,
            a second element slidable on said first element for limited linear movement thereon, and
            manually operable screw members for selectively restraining said first and second elements against movement relative to each other and to said support plate,
         a contact member pivoted for limited rotary movement on said second element, said contact member normally being resiliently biased in a generally vertical position,
         said first and second elements of said positioning mechanism being movable relative to each other and to said support plate to permit manual positioning of said contact member between the cab and the adjacent forward outer corner at a predetermined distance from the cab,
         an electrical switch mounted on said second element and provided with an operating member movable in response to movement of said contact member between an extended position closing said switch and
            a retracted position opening said switch,
            said operating member
               normally being disposed in its said retracted position with said switch open when said contact member is in its generally vertical position and
               moving to its extended position to close said switch upon pivotal movement of said contact member away from its said generally vertical position, and
         an electrical circuit removably connected to the power source and extending between said switches and said transducer means,
         pivotal movement of the contact member of either alarm assembly moving the operating member of the switch of that assembly from its retracted to its extended position to close the said switch and electrically connect said transducer means to the power source and actuate said transducer means to create said discernible event in response to contact between said one contact member and the adjacent forward outer corner should such corner rotate beyond said predetermined distance during a turning maneuver of the truck.

15. An alarm assembly for use in a warning system employing an electrically operated warning device to warn the driver of a pick-up truck that the forward extension of a fifth wheel trailer pivotally supported on a hitch secured in the bed of the truck is approaching a point of impact with the cab of the truck during a turning maneuver of the truck, the alarm assembly comprising
   a mounting member removably mounted on the bed externally of the cab,
   a positioning mechanism carried on said mounting member,
   a contact member supported on said positioning mechanism for limited pivotal movement thereon,
   biasing means normally maintaining said contact member in a generally vertical position
   a switch supported on said positioning mechanism and provided with an operating member movable with said contact member between a first position opening said switch when said contact member is disposed in its said generally vertical position and a second position closing said switch and connecting the warning device with the electrical system of the truck to activate the warning device when said contact member is pivoted from its said generally vertical position, said positioning mechanism being manually adjustable relative to the cab to position said contact member between the cab and the forward extension for engagement with such forward extension at a predetermined distance from the point of impact, said contact member and said operating member being moved and operating said switch to activate the warning device to gain the attention of the truck driver in response to contact between such contact member and the forward extension upon rotary movement of such forward extension beyond said predetermined distance during a turning maneuver of the truck.

16. An alarm assembly according to claim 15, characterized by said contact member comprising
a base portion pivotally mounted on said positioning mechanism and
an upper portion releasably mounted on said base portion to permit
selective movement of said upper portion on said base portion for further adjustment of the position of said contact member relative to the forward extension and
alternate use of upper portions of various lengths and/or configurations.

17. An alarm assembly according to claim 16, characterized by said mounting member providing a generally horizontally disposed support plate and said positioning mechanism comprising
a first positioning element pivoted on said support plate for limited rotary movement thereon incrementally between a multiplicity of positions,
a pair of guide rails mounted on said first positioning element and arranged to define a path extending generally radially from the pivot point of said first positioning element,
a first manually operable screw means for releasably clamping said first positioning element in a selected one of said incremental positions,
a second positioning element slidably disposed on said first positioning element and guided by said guide rails for movement along said generally radial path, and
a second manually operated screw means for releasably clamping said second positioning element in a selected position along said path.

18. An alarm assembly according to claim 15, characterized by said mounting member providing a generally horizontally disposed support plate, said positioning mechanism comprising
a first element pivoted on said support plate for limited rotary movement thereon,
a second element slidable on said first element for limited linear movement thereon, said contact member being pivoted on said second element a mount plate disposed on said second element spaced from said contact member, said switch being carried by said mount plate and provided with an operating member projecting into contact with said contact member, said operating member being movable with said contact member between
an extended position closing said switch upon pivotal movement of said contact member away from its said generally vertical position and
a retracted position opening said switch when said contact member is in its generally vertical position, a positioning member extending through said mount plate and engaging said contact member, said positioning member being manually adjustable to define said generally vertical position of said contact member, said biasing means comprising a spring member mounted on said positioning member and tensioned to normally bias said contact member toward said mount plate to said generally vertical position but to further compress to permit rotation of said contact member away from said mount plate, and resilient spring means biasing said operating member to its said extended position in response to pivotal movement of said contact member from its generally vertical position but permitting movement of said operating member to its said retracted position upon movement of said contact member to its said generally vertical position.

* * * * *